(12) United States Patent
Hawthorn et al.

(10) Patent No.: US 8,113,536 B2
(45) Date of Patent: Feb. 14, 2012

(54) METHOD OF FOLDING AN INFLATABLE CUSHION AND AIRBAG MODULE HAVING A FOLDED INFLATABLE CUSHION

(75) Inventors: Laura A. Hawthorn, Tipp City, OH (US); Patrick W. Schatz, Tipp City, OH (US)

(73) Assignee: Autoliv Development AB, Vargarda (SE)

( * ) Notice: Subject to any disclaimer, the term of this patent is extended or adjusted under 35 U.S.C. 154(b) by 216 days.

(21) Appl. No.: 12/686,053

(22) Filed: Jan. 12, 2010

(65) Prior Publication Data

US 2010/0176578 A1 Jul. 15, 2010

Related U.S. Application Data

(60) Provisional application No. 61/144,213, filed on Jan. 13, 2009.

(51) Int. Cl.
*B60R 21/237* (2006.01)

(52) U.S. Cl. .................... 280/728.1; 280/743.1

(58) Field of Classification Search ............... 280/728.1, 280/731, 732, 743.1; 53/429
See application file for complete search history.

(56) References Cited

U.S. PATENT DOCUMENTS

| | | | | |
|---|---|---|---|---|
| 5,382,048 A | * | 1/1995 | Paxton et al. | 280/728.1 |
| 5,492,367 A | * | 2/1996 | Albright et al. | 280/743.1 |
| 5,496,056 A | * | 3/1996 | Dyer | 280/728.1 |
| 5,501,489 A | * | 3/1996 | Folsom et al. | 280/743.1 |
| 5,538,281 A | * | 7/1996 | Patercsak | 280/743.1 |
| 7,223,224 B2 | * | 5/2007 | Card et al. | 493/458 |
| 7,571,933 B2 | * | 8/2009 | Thomas | 280/743.1 |
| 7,753,406 B2 | * | 7/2010 | Guha-Thakurta | 280/743.1 |
| 2002/0070541 A1 | * | 6/2002 | Hawthorn et al. | 280/743.1 |
| 2005/0134032 A1 | * | 6/2005 | Downing et al. | 280/743.1 |
| 2006/0131858 A1 | * | 6/2006 | Guha-Thakurta | 280/743.1 |
| 2006/0175818 A1 | * | 8/2006 | Thomas | 280/743.1 |

* cited by examiner

*Primary Examiner* — Paul N Dickson
*Assistant Examiner* — Barry Gooden, Jr.
(74) *Attorney, Agent, or Firm* — Harness, Dickey & Pierce, P.L.C.

(57) ABSTRACT

A method of folding an inflatable cushion into a housing of an airbag module is provided, the method including: arranging the inflatable cushion in an un-inflated position to define a first pleat and a second pleat each extending from a first end of the inflatable cushion to a second end of the inflatable cushion, the second end being opposite the first end, the inflatable cushion also having a first flap portion extending from the first pleat and a second flap portion extending from the second pleat, the second flap portion being opposite the first flap portion; rolling the first end and the second end of the inflatable cushion towards each other and underneath a top surface of the inflatable cushion, wherein a first pocket is formed by the first pleat below the top surface and a second pocket below the top surface is formed by the second pleat; and folding the first flap into the first pocket and folding the second flap into the second pocket.

16 Claims, 2 Drawing Sheets

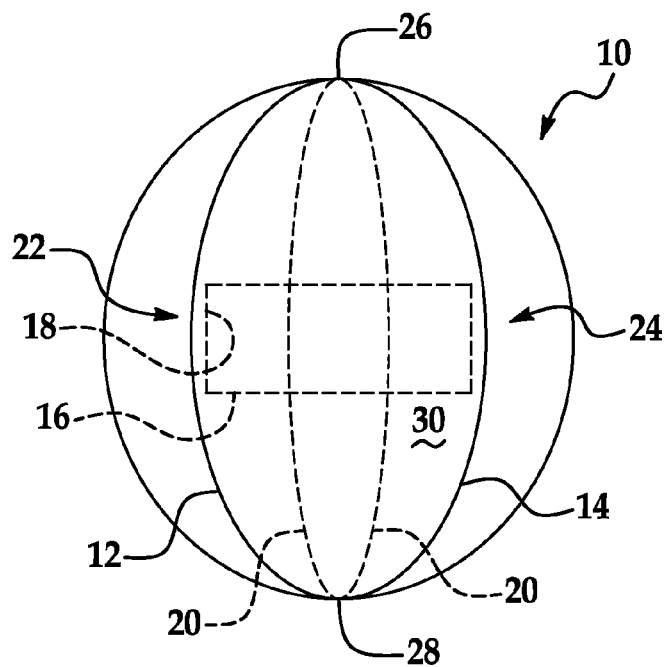
FIG. 1
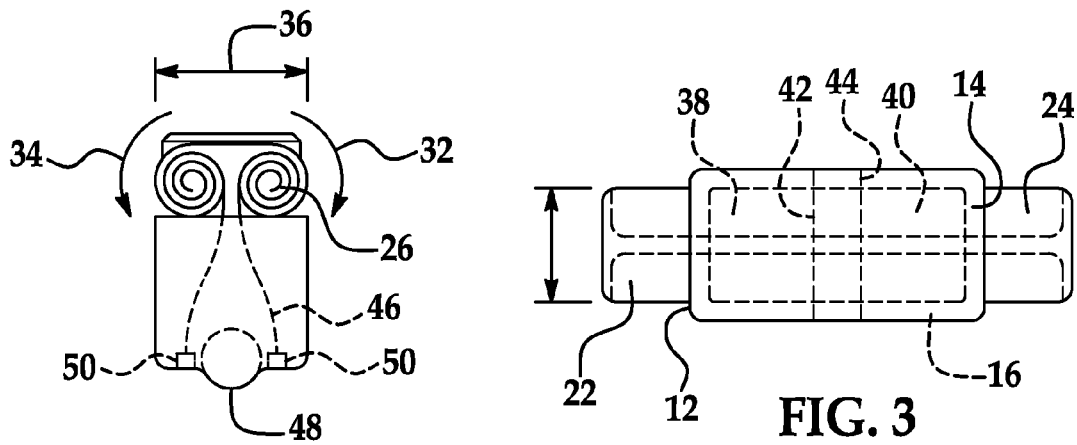
FIG. 2
FIG. 3
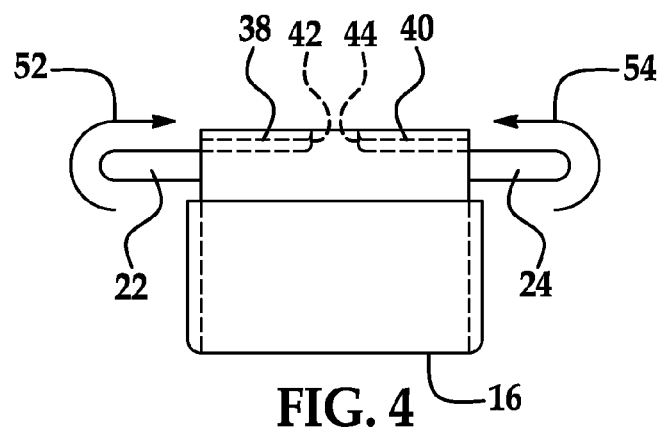
FIG. 4

METHOD OF FOLDING AN INFLATABLE CUSHION AND AIRBAG MODULE HAVING A FOLDED INFLATABLE CUSHION

CROSS-REFERENCE TO RELATED APPLICATIONS

This application claims the benefit of U.S. Provisional Patent Application Ser. No. 61/144,213 filed Jan. 13, 2009, the contents of which are incorporated herein by reference thereto.

BACKGROUND

Exemplary embodiments of the present invention relate generally to inflatable cushions and methods of storing the same in a housing of an airbag module.

Inflatable cushions for vehicles deploy through a deployable member or door that covers the un-inflated cushion Accordingly, it is desirable to store and fold the inflatable cushion in the airbag module in a manner that provides for an initial deployment configuration as the inflatable cushion deploys from the airbag module.

SUMMARY OF THE INVENTION

In one exemplary embodiment a method of folding an inflatable cushion is provided, the method including: arranging the inflatable cushion in an un-inflated position to define a first pleat and a second pleat each extending from a first end of the inflatable cushion to a second end of the inflatable cushion, the second end being opposite the first end, the inflatable cushion also having a first flap portion extending from the first pleat and a second flap portion extending from the second pleat, the second flap portion being opposite the first flap portion; rolling the first end and the second end of the inflatable cushion towards each other and underneath a top surface of the inflatable cushion, wherein a first pocket is formed by the first pleat below the top surface and a second pocket below the top surface is formed by the second pleat; and folding the first flap into the first pocket and folding the second flap into the second pocket.

A method of folding an inflatable cushion into a housing of an airbag module is also provided, the method comprising: arranging the inflatable cushion in an un-inflated position over an inflation opening of a housing of the airbag module to define a first pleat and a second pleat each extending from a first end of the inflatable cushion to a second end of the inflatable cushion, the second end being opposite the first end, the inflatable cushion also having a first flap portion extending from the first pleat and a second flap portion extending from the second pleat, the second flap portion being opposite the first flap portion, the first flap portion and the second flap portion each comprising inflatable portions of the inflatable cushion; rolling the first end and the second end of the inflatable cushion towards each other and underneath a top surface of the inflatable cushion, wherein a first pocket is formed by the first pleat below the top surface and a second pocket below the top surface is formed by the second pleat; and folding the first flap into the first pocket and folding the second flap into the second pocket to provide a folded inflatable cushion, wherein the folded inflatable cushion can be inserted into the inflation opening of the housing.

An airbag module for a vehicle is also provide, the airbag module comprising: a housing; an inflatable cushion stored in the housing in an un-inflated configuration, wherein the inflatable cushion has a pair of pockets at opposite ends of the inflatable cushion in the un-inflated configuration, the pair of pockets being defined by a pair of pleats in the inflatable cushion and a pair of flap portions of the inflatable cushion are folded into the pair of pockets prior to the inflatable cushion being stored in the housing in the un-inflated configuration; and an inflator for inflating the inflatable cushion.

BRIEF DESCRIPTION OF THE DRAWINGS

FIG. 1 is a top plan view of an un-inflated cushion prior to it being folded an inserted into a housing of an airbag module; and FIGS. 2-6 are views illustrating a method of folding an inflatable cushion in accordance with exemplary embodiments of the present invention.

DETAILED DESCRIPTION OF THE PREFERRED EMBODIMENTS

Figure 5:
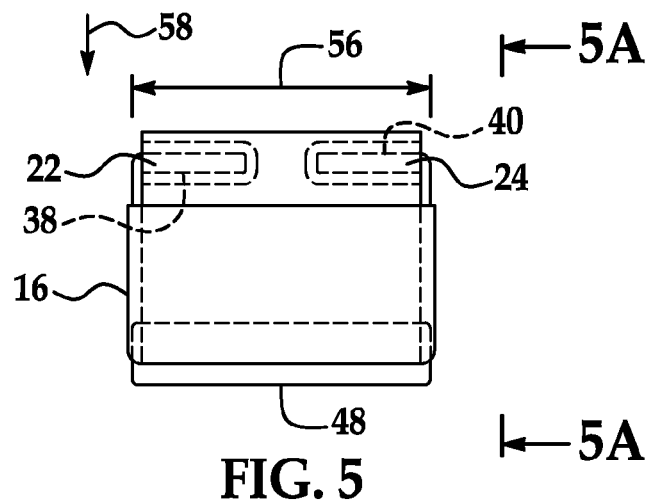

Reference will now be made in detail to exemplary embodiments of the invention, one or more examples of which are illustrated in the accompanying drawings. Each example is provided by way of explanation of the invention, not limitation of the invention.

Referring to the drawings, and particularly to FIG. 1, a top view of an unfolded inflatable cushion 10 is shown. As is known in the related arts the inflatable cushion has an inflation opening (not shown) that is secured to an airbag module with a retainer ring (not shown) or other equivalent securement device or feature for example, a plurality of studs, hooks or features on either an inner side or outer side of the housing that engage openings in the inflatable cushion wherein the inflatable cushion is secured thereto by a retainer plate or other equivalent device, if necessary, so that the inflation opening of the cushion is located proximate to an inflator of the airbag module. Accordingly, inflation gas from the inflator will pass into the inflation opening and inflate the inflatable cushion. Exemplary embodiments of the present invention are related to the folding and storing of the inflatable cushion in the airbag module such that desired inflation characteristics are achieved as the cushion is inflated by the gases of the inflator.

In FIG. 1, the inflatable cushion is configured to have at least one pleat 12, 14 located at either side of a housing 16 having an opening 18 into which the cushion will be stored in a folded state and deploy therefrom. The inflatable cushion may also have additional pleats 20 located in a central portion of the inflatable cushion. Pleats 12, 14 and 20 can be formed by folding sections of the inflatable cushion wherein the pleat extends from the top to the bottom of the cushion shown in FIG. 1. In the configuration shown in FIG. 1, pleats 12 and 14 will define a pair of flap portions 22 and 24 each being located at either end of the housing. Flap portions 22 and 24 are inflatable portions of the inflatable cushion and in one embodiment extend laterally away from the vertically arranged pleats with reference to the orientation in FIG. 1. In addition, the pleats also comprise inflatable portions of the inflatable cushion. However, and in a non-limiting alternative embodiment one or more of the pleats may be a non-inflatable portion of the inflatable cushion.

Referring now to FIGS. 1-3, a top portion 26 and a bottom portion 28 of the inflatable cushion are each rolled or folded towards the housing while still maintaining the pleats. As illustrated, the top and bottom edges are rolled under the top surface 30 of the unfolded cushion illustrated in FIG. 1. For example and as illustrated in FIG. 2, the top portion 26 and the bottom portion 28 are folded or rolled in the direction of arrows 32 and 34 respectively such that the folded inflatable cushion now has a dimension 36, which corresponds to a dimension of the opening in the housing. In addition, the flaps 22 and 24 are now also folded to the same dimension. The location of pleats 12 and 14 and the folding or rolling of the top and bottom portions or edges towards each other and underneath the top surface will cause a pair of pockets 38 and 40 to be formed under the remaining top surface 30 of the inflatable cushion. In addition, and depending on the location of central pleats 20 the same may provide an inner wall 42, 44 of pockets 38 and 40. FIG. 2 shows an opening 46 of the inflatable cushion secured proximate to an inflator 48 via a retainer plate 50.

Figure 5A:
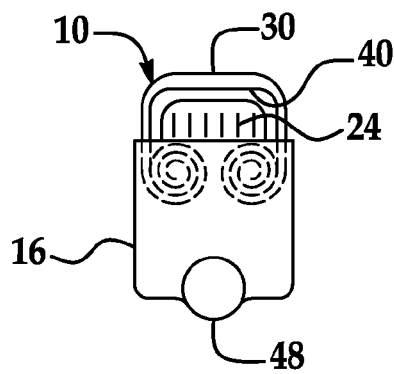

Referring now to FIG. 4 each flap 22 and 24, which comprise portions of the inflatable cushion are now folded over and tucked in the direction of arrows 52 and 54 such that the flaps are tucked into the pockets 38 and 40 formed by the folding or rolling process. FIG. 5 illustrates the flaps 22 and 24 tucked in pockets 38 and 40 such that the folded inflatable cushion 10 now have a dimension 56 which corresponds to a complimentary length of the opening of the housing 16 of the airbag module. FIG. 5A illustrates an end view FIG. 5 along lines 5A-5A of FIG. 5. Once in this configuration the inflatable cushion is now pushed down into the opening of the housing in the direction of arrow 58 until it is properly stored in the housing of the airbag module in the un-inflated configuration.

The method of folding of an inflatable cushion and an airbag module with a cushion folded in accordance with exemplary embodiments of the present invention will provide a unique break out or initial cushion deployment when the cushion is initially inflated by the inflator. For example and when the cushion is inflated during an activation event, the folded cushion will move into the position illustrated in FIGS. 5 and 5A (e.g., out of the housing in a direction opposite to arrow 58), then each flap 22 and 24 will fold or expand out laterally enlarging the dimension 56 of the cushion as it inflates to the configuration illustrated in FIG. 3, for example. Accordingly and with this fold configuration (e.g., pockets, pleats and flaps) the inflatable cushion will deploy laterally first and then the top and bottom edges with unroll to the a configuration similar to FIG. 1 however the inflatable cushion will not be flat as it is inflating. This inflation sequence will reduce the initial punch out or inflation forces directly out of the housing or towards an occupant as the inflatable cushion is allowed to expand laterally first once as it emerges from the housing.

Figure 6:
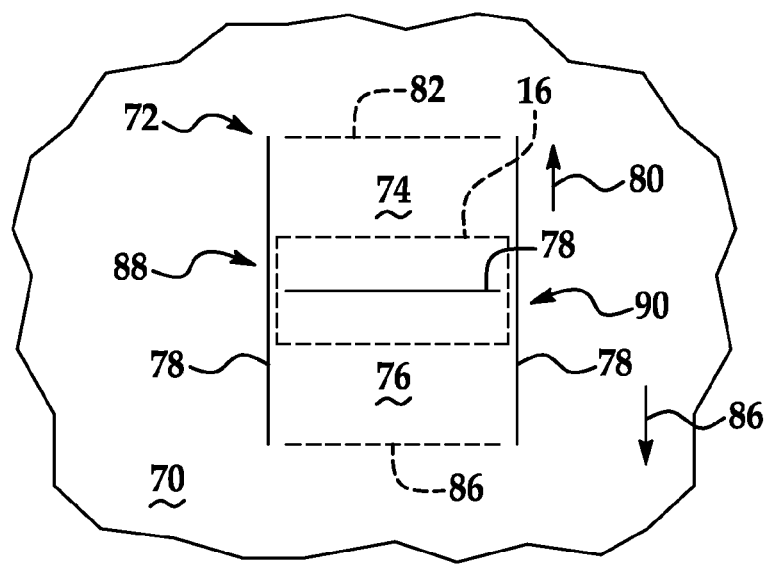

FIG. 6 illustrates a top surface of an instrument panel or other surface 70 having a deployable cover or door 72 disposed over the opening of the housing 16 of the airbag module. The deployable cover or cover has a top door portion 74 and a bottom door portion 76 each being defined by pre-weakened tear lines 78 such that the top door portion 74 will deploy upwardly in the direction of arrow 80 and bend or hinge along line 82, which does not tear during inflation of the inflatable cushion. Similarly, the bottom door portion 76 will deploy downwardly in the direction of arrow 84 and bend or hinge along line 86, which does not tear during inflation of the inflation of the inflatable cushion. The aforementioned deployable door is sometimes referred to as an "H" shaped door since the tear lines resemble an "H". In accordance with embodiments of the present invention other configurations may be employed "I" shaped, "U" shaped, etc. and the tear lines may be provided using techniques that allow for invisible tear lines.

In accordance with various embodiments of the present invention, the folded cushion or method of folding a cushion illustrated in FIGS. 1-5A is particularly suited for an "H" shaped door as the lateral sides 88 and 90 of the door are free from obstructions such that the flap portions 22 and 24 may deploy outwardly first as described above. This feature allows the cushion to expand outwardly or laterally should an obstruction (e.g., car seat, out of position occupant, etc.) be in front of the cushion or doors or both as it deploys thus reducing the initial break out force. Moreover, this fold will also allow the cushion to expand outwardly or laterally in the event there is no obstruction in front of the cushion as it deploys also reducing the initial break out force.

Furthermore and since the top and bottom edges are rolled under the exterior surface they are less likely to be caught on objects in front of the inflatable cushion as it inflates.

It is to be understood that the deployable door configuration illustrated in FIG. 6 is merely an example and numerous alternative configurations may be employed for example and in one non-limiting embodiment, the peripheral edges of the opening of the housing may be in various locations with regard to the door pattern and/or tear lines, for example the peripheral edges of the opening of the housing may be directly beneath the tear lines and/or the hinge lines illustrated in FIG. 6.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the present application.

What is claimed is:

1. A method of folding an inflatable cushion into a housing of an airbag module, the method comprising:
arranging the inflatable cushion in an un-inflated position to define a first pleat and a second pleat each extending from a first end of the inflatable cushion to a second end of the inflatable cushion, the second end being opposite the first end, the inflatable cushion also having a first flap portion extending from the first pleat and a second flap portion extending from the second pleat, the second flap portion being opposite the first flap portion;
rolling the first end and the second end of the inflatable cushion towards each other and underneath a top surface of the inflatable cushion, wherein a first pocket is formed by the first pleat below the top surface and a second pocket below the top surface is formed by the second pleat; and
folding the first flap portion into the first pocket and folding the second flap portion into the second pocket to provide a folded inflatable cushion.

2. The method as in claim 1, wherein a first dimension of the folded inflatable cushion is defined by a distance between the first pleat and the second pleat.

3. The method as in claim 1, wherein the inflatable cushion further comprises a pair of pleats extending from the first end to the second end when the inflatable cushion is in the un-inflated position, the pair of pleats being spaced from each other and being located between the first pleat and the second pleat, each one of the pair of pleats defining a depth of either the first pocket or the second pocket.

4. The method as in claim 1, further comprising securing an inflation opening of the inflatable cushion to a housing of the airbag module prior to the step of arranging the arranging the inflatable cushion in the un-inflated position.

5. The method as in claim 4, further comprising inserting the folded inflatable cushion into an inflation opening of the housing.

6. The method as in claim 4, wherein a first dimension of the folded inflatable cushion is defined by a distance between the first pleat and the second pleat and the first dimension is smaller than a corresponding dimension of an inflation opening of the housing.

7. The method as in claim 1, wherein a first dimension of the folded inflatable cushion is defined by a distance between the first pleat and the second pleat and, wherein the inflatable cushion further comprises a pair of pleats extending from the first end to the second end when the inflatable cushion is in the un-inflated position, the pair of pleats being spaced from each other and being located between the first pleat and the second pleat, each one of the pair of pleats defining a depth of either the first pocket or the second pocket.

8. The method as in claim 7, further comprising securing an inflation opening of the inflatable cushion to a housing of the airbag module prior to the step of arranging the inflatable cushion in the un-inflated position.

9. The method as in claim 1, wherein the first and second pleats are vertically arranged and the first flap portion and the second flap portion extending laterally from the first and second pleats.

10. A method of folding an inflatable cushion into a housing of an airbag module, the method comprising:
arranging the inflatable cushion in an un-inflated position over an inflation opening of the housing of the airbag module to define a first pleat and a second pleat each extending from a first end of the inflatable cushion to a second end of the inflatable cushion, the second end being opposite the first end, the inflatable cushion also having a first flap portion extending from the first pleat and a second flap portion extending from the second pleat, the second flap portion being opposite the first flap portion, the first flap portion and the second flap portion each comprising inflatable portions of the inflatable cushion;
rolling the first end and the second end of the inflatable cushion towards each other and underneath a top surface of the inflatable cushion, wherein a first pocket is formed by the first pleat below the top surface and a second pocket below the top surface is formed by the second pleat; and
folding the first flap portion into the first pocket and folding the second flap portion into the second pocket to provide a folded inflatable cushion, wherein the folded inflatable cushion can be inserted into the inflation opening of the housing.

11. The method as in claim 10, wherein a first dimension of the folded inflatable cushion is defined by a distance between the first pleat and the second pleat, the first dimension being smaller than a corresponding dimension of the inflation opening of the housing.

12. The method as in claim 10, wherein the inflatable cushion further comprises a pair of pleats extending from the first end to the second end when the inflatable cushion is in the un-inflated position, the pair of pleats being spaced from each other and being located between the first pleat and the second pleat, each one of the pair of pleats defining a depth of either the first pocket or the second pocket.

13. The method as in claim 10, further comprising securing an inflation opening of the inflatable cushion to the housing.

14. The method as in claim 10, further comprising inserting the folded inflatable cushion into the inflation opening of the housing.

15. An airbag module for a vehicle, comprising:
a housing;
an inflatable cushion stored in the housing in an un-inflated configuration to define a first pleat and a second pleat each extending from a first end of the inflatable cushion to a second end of the inflatable cushion, the second end being opposite the first end, the inflatable cushion also having a first flap portion extending from the first pleat and a second flap portion extending from the second pleat, the second flap portion being opposite the first flap portion;
wherein the first end and the second end of the inflatable cushion are rolled toward each other and underneath a top surface of the inflatable cushion such that a first pocket is formed by the first pleat below the top surface and a second pocket below the top surface is formed by the second pleat; and
wherein the first flap portion is folded into the first pocket and the second flap portion is folded into the second pocket.

16. An airbag module as in claim 15, wherein a first dimension of the un-inflated configuration is defined by a distance between the first pleat and the second pleat.

* * * * *